Patented Mar. 28, 1933

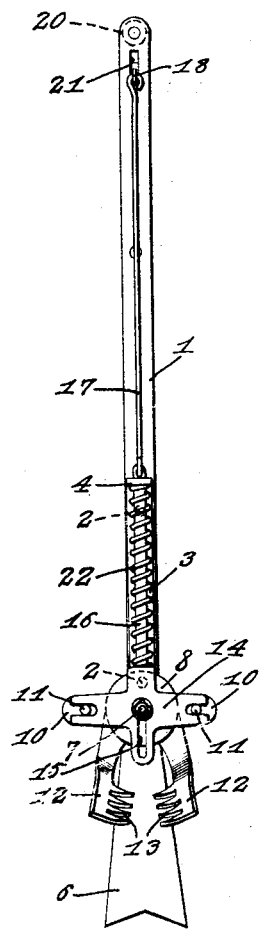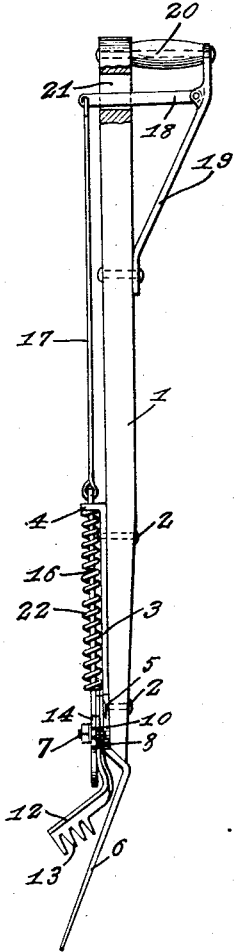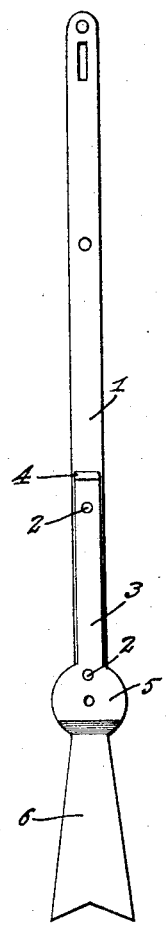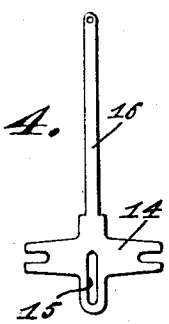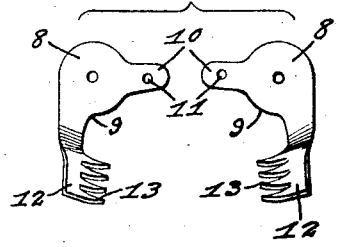

1,903,097

UNITED STATES PATENT OFFICE

RAY E. DUNFORD AND ELI W. F. McMILLAN, OF EVERETT, WASHINGTON

WEEDER

Application filed February 15, 1932. Serial No. 593,098.

This invention relates to agricultural implements and its general object is to provide a tool primarily designed for removing weeds and the like from lawns, in an easy and expeditious manner and while the operator is standing in a natural position, thus eliminating strain on the operator's back and legs which is brought about when weeds are removed in the usual manner, such as with a knife or short handled tool.

A further object of the invention is to provide a tool of the character set forth, that removes weeds and the like without damaging or disfiguring the lawn, is simple in construction, inexpensive to manufacture, easy to operate, and extremely efficient in operation and service.

This invention also consists in certain other features of construction and in the combination and arrangement of the several parts, to be hereinafter fully described, illustrated in the accompanying drawing and specifically pointed out in the appended claims.

In describing our invention in detail, reference will be had to the accompanying drawing wherein like characters denote like or corresponding parts throughout the several views, and in which:—

Figure 1 is a front view of the weeder which forms the subject matter of the present invention.

Figure 2 is a side elevation thereof.

Figure 3 is a front view with parts removed.

Figure 4 is a similar view of the operating member for the teeth carrying elements.

Figure 5 is a view illustrating the teeth carrying elements.

Figure 6 is a sectional view illustrating the teeth in cooperative relation.

Referring to the drawing in detail, the reference numeral 1 indicates the handle of the tool, and while the handle may be of any desired cross sectional shape, it is preferably square in cross section, with a tapered lower end as best shown in Figure 2.

Secured to one side of the lower portion of the handle through the instrumentality of bolt means 2 is a strip 3 which has its upper end bent at right angles to the body of the strip to provide an apertured ear 4. Formed with the lower end of the strip is a substantially circular portion 5 and in turn has formed therewith a blade 6 which is tapered outwardly toward its lower end to provide a relatively wide lower end as best shown in Figure 3, and the lower end is cut in triangle formation and beveled if desired, but in any event is sharp in order to readily penetrate the ground during the use of the tool as will be apparent. The substantially circular portion is bent at an angle at its juncture with the blade 6, and this angle portion is disposed in contacting engagement with the inclined lower end of the handle as clearly shown in Figure 2.

Passing through the center of the substantially circular portion 5 is a bolt of a bolt and nut connection 7 which has journaled thereon the rounded portions 8 of the teeth carrying members 9 and extending from the periphery of the rounded portions are arms 10 which have formed therewith or otherwise secured thereto pins 11.

Depending from the rounded portions are jaws 12 that have formed therewith teeth 13, the jaws being bent in a manner whereby the teeth of the jaws cooperate to insure a gripping action in removing a weed or the like as shown in Figure 6.

The teeth carrying members are superimposed with respect to each other and arranged upon the outermost member for slidable movement thereon is the jaw operating member which includes an elongated body portion 14 having a vertical slot 15 arranged therein for the purpose of accommodating the bolt of the bolt and nut connection 7 and the ends of the body portion are slotted to receive the pins 11, while formed with and rising from the body portion is a flat stem 16 that is passed through the aperture of the ear 4 and has arranged in its upper end an aperture to receive an eye formed with the lower end of a rod 17 which is provided with an eye at its upper end to receive one end of a lever 18 which has its opposite end pivotally secured to a handle bracket 19 and the bracket 19 is fixed to the handle 1 at its lower end while its upper end is disposed in spaced relation to the handle which together with the upper end of the bracket has passed therethrough means for receiving a gripping element 20.

The lever 18 is mounted for reciprocation in a slot 21 arranged in the upper end of the handle 1, and it will be obvious that when the lever 18 is moved on its pivot in an upward direction, the jaws 12 will be disposed together for arranging the teeth accordingly, but the jaws are normally held apart by a coil spring 22 that surrounds the flat stem 16 and has its end convolutions engaging the ear 4 and the upper portion of the body 14 as clearly shown in Figures 1 and 2.

In the use of the tool, the blade is inserted in the ground adjacent a weed or the like and due to the fact that the blade is inclined as clearly shown in Figure 2, it will cut the root of the weed or the like. The lever 18 is then pulled upwardly for disposing the teeth 13 together below the foliage of the weed or the like, the blade is then removed from the ground which of course will remove the weed due to the gripping action of the teeth under the foliage thereof.

It is thought from the foregoing description that the advantages and novel features of our invention will be readily apparent.

We desire it to be understood that we may make changes in the construction and in the combination and arrangement of the several parts, provided that such changes fall within the scope of the appended claims.

What we claim is:

1. A weeder comprising a handle, a strip secured to the lower portion thereof, a substantially circular portion formed with said strip, a blade disposed at an inclination and being formed with the substantially circular portion, toothed members journaled on the substantially circular portion, pins extending from the toothed members, means for operating the toothed members and receiving the pins, a stem included in the operating means, an ear formed with the strip for receiving the stem for slidable movement therein, a lever pivotally secured at the upper end of the handle and having connection with the stem for operating the toothed members for disposing the teeth thereof in cooperative association with respect to each other and with the blade respectively.

2. A weeder comprising a handle, a strip secured to the lower portion of said handle and having an apertured ear extending at right angles from the top thereof, a substantially circular portion formed with the lower end of said strip, an inclined blade tapered toward one end and being formed with the substantially circular portion, toothed members, rounded portions formed with said toothed members and being journaled to the substantially circular portion, arms extending from the rounded portions, pins secured to said arms, operating means for said toothed members and receiving said pins, a stem rising from the operating means and extending through the apertured ear, a coil spring surrounding the stem for holding and urging the toothed members to normal position, a handle bracket secured to the upper end of said handle, a lever pivotally secured to the handle bracket, means for connecting the lever with the flat stem and said lever being movable for disposing the teeth of the toothed members in operative position and cooperative association with the blade.

3. A weeder comprising a handle, a strip secured to the lower portion of said handle, a blade having connection with the lower end of the strip and extending at an inclination, toothed jaw members journaled for movement above and at an angle to the blade, pins extending from the jaw members, means mounted for slidable movement on the journal of the jaw members and provided with slots to receive the pins to actuate the jaw members for cooperation with each other and with the blade respectively, spring means for the slidably mounted means to urge and normally hold the jaw members apart and means having connection with the handle for operating the slidably mounted means.

In testimony whereof we affix our signatures.

RAY E. DUNFORD.
ELI W. F. McMILLAN.